(12) United States Patent
Miyake

(10) Patent No.: US 8,381,783 B2
(45) Date of Patent: Feb. 26, 2013

(54) PNEUMATIC TIRE

(75) Inventor: Akinori Miyake, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 350 days.

(21) Appl. No.: 12/792,830

(22) Filed: Jun. 3, 2010

(65) Prior Publication Data

US 2010/0314013 A1 Dec. 16, 2010

(30) Foreign Application Priority Data

Jun. 10, 2009 (JP) .................................. 2009-139422

(51) Int. Cl.
*B60C 11/12* (2006.01)
*B60C 13/02* (2006.01)

(52) U.S. Cl. ............................... 152/209.18; 152/209.16

(58) Field of Classification Search ............. 152/209.18, 152/209.16, 209.11, 209.3, 240, 523
See application file for complete search history.

(56) References Cited

U.S. PATENT DOCUMENTS

| 4,281,702 | A  | * | 8/1981  | Grosch et al. | ............ | 152/209.18 |
| 5,733,393 | A  | * | 3/1998  | Hubbell et al. | ............ | 152/209.5 |
| 7,832,439 | B2 | * | 11/2010 | Ikeda et al. | ............... | 152/209.16 |

FOREIGN PATENT DOCUMENTS

| DE | 198 53 474  | * | 5/1999 |
| JP | 2007-106255 |   | 4/2007 |

\* cited by examiner

*Primary Examiner* — Eric Hug
(74) *Attorney, Agent, or Firm* — Fish & Richardson P.C.

(57) ABSTRACT

The object of the present invention is to provide a pneumatic tire which reduces the partial wear while maintaining the durability in the shoulder land portion. In order to achieve the above object, the thin groove extending in the circumferential direction of the tire on the shoulder land portion is arranged so as to be perpendicular to or inclined outward to the groove bottom from the tread surface as viewed in the cross-section of the meridian direction of the tire, and the buttress groove is arranged to position at the inner side than the groove bottom of the thin groove with respect to a normal line of the tread surface as viewed in the radial direction of the tire, at the same time, at the outer side than the inner surface of the tire as viewed in the radial direction of the tire.

1 Claim, 2 Drawing Sheets

(a)

(b)

(a) 
(b) 
(c) 
(d) 
(e) 
(f)

(g) 
(h)

PNEUMATIC TIRE

BACKGROUND OF THE INVENTION

1. Field of the Invention

The present invention relates to a pneumatic tire which has a tread surface including a shoulder land portion extending in a circumferential direction of the tire, and a thin groove extending in a circumferential direction of the tire located at, as viewed in a width direction of the tire, the outer side than a contact edge of the shoulder land portion; the thin groove partitioning the shoulder land portion into a main land portion located at the inner side and a sacrifice portion located at the outer side of shoulder land portion, and the tire including a buttress groove extending in a circumferential direction of the tire located at the outer side than the contact edge of the shoulder land portion.

2. Description of the Related Art

In a pneumatic tire, generally, in an area adjacent to a contact edge of a shoulder land portion in a tread surface, the contact pressure tends to increase during running. As a result, there may be caused a problem of partial wear in which, compared to other land portion in the tread surface, an amount of wear becomes larger in the area adjacent to the contact edge of the shoulder land portion. Conventionally, a preventive method against the partial wear is widely employed, in which a thin groove extending in a circumferential direction of the tire located, as viewed in a width direction of the tire, at the inner side than the contact edge is formed in an area adjacent to the contact edge of the shoulder land portion in the tread surface. The sacrifice portion with a higher stiffness, which is partitioned by the thin groove located at the outer side of the tire, provides the higher effectiveness for reducing the partial wear. On the other hand, too high stiffness of the sacrifice portion causes stress to converge on the groove bottom of the thin groove due to the deformation of the sacrifice portion during running on the road. This causes cracks to be generated on the groove bottom of the thin groove. As a result, even in an initial to middle stage of use of the tire, the sacrifice portion may be broken.

Japanese Unexamined Patent Publication No. 2007-106255 teaches a method to reduce the partial wear in an area adjacent to the contact edge of the shoulder land portion in the tread surface. That is, a pneumatic tire has a shoulder land portion including a thin groove extending in a circumferential direction of the tire formed in an area adjacent to the contact edge, and the tire includes a buttress groove extending in a circumferential direction of the tire formed at the outer side than the contact edge of the shoulder land portion as viewed in a width direction of the tire. The thin groove is inclined inward from the tread surface toward the groove bottom as viewed in the cross-section in a meridian direction of the tire. However, in this method, since the thin groove is inclined inward from the tread surface toward the groove bottom as viewed in the cross-section in the meridian direction of the tire, the stiffness of the main land portion, which is located at the inner side than the thin groove as viewed width direction of the tire, is reduced. As a result, an amount of wear becomes larger in an area of the main land portion at the thin groove side edge (in the main land portion, in an area adjacent to an edge line formed by the thin groove and the main land portion therebetween) resulting in a problem of partial wear. Further, the method does not define the configuration of the buttress groove. Depending on the configuration of the buttress groove, cracks may occur on the buttress groove. Furthermore, in the above method, depending on the location of the buttress groove as viewed in a radial direction of the tire, the stiffness may be largely reduced in a base area of the sacrifice portion (generally the same position as that of the thin groove bottom as viewed in a radial direction of the tire). As a result, the partial wear reduction effect may be degraded.

SUMMARY OF THE INVENTION

The present invention has been made in light of the above circumstances and an object thereof is to provide a pneumatic tire which reduces the partial wear while maintaining the durability in the shoulder land portion.

The above-mentioned object can be achieved by the present invention as follows. That is, the present invention provides a pneumatic tire, comprising a tread surface, the tread surface including: a shoulder land portion extending in a circumferential direction of the tire; and a thin groove extending in a circumferential direction of the tire located at, as viewed in a width direction of the tire, the inner side than a contact edge of the shoulder land portion, the thin groove partitioning the shoulder land portion into a main land portion located at the inner side and a sacrifice portion located at the outer side thereof, the pneumatic tire also including a buttress groove extending in the circumferential direction of the tire located at, as viewed in a width direction of the tire, the outer side than the contact edge of the shoulder land portion, wherein the thin groove is arranged to, as viewed in the cross-section in a meridian direction of the tire, extend from the tread surface perpendicularly or being inclined outward with respect to the groove bottom, when defining a depth of the thin groove as "D", a distance from an edge line formed by the thin groove and the main land portion therebetween to an inner surface of the tire as "T", and a distance from the contact edge of the shoulder land portion to a virtual straight line extended, as viewed in a radial direction of the tire, parallel to the tread surface through an outer end of the buttress groove as "E", the values are set to be $D \leqq E \leqq T$ (wherein, each of D, E and T is measured in a direction of a normal line of the tread surface).

In the above-described pneumatic tire, the thin groove extending in the circumferential direction of the tire on the shoulder land portion is arranged so as to be perpendicular to or inclined outward to the groove bottom from the tread surface as viewed in the cross-section of the meridian direction of the tire. With this arrangement, the stiffness of the main land portion can be ensured and the anti-wear performance of the entire shoulder land portion can be improved. Furthermore, the stiffness in a base area of the sacrifice portion can be appropriately reduced. Even when the sacrifice portion is deformed during running on the road, the stress is prevented from converging on the groove bottom of the thin groove. Thus, cracks can be prevented from occurring on the groove bottom of the thin groove. Further by arranging the buttress groove to position at the inner side than the groove bottom of the thin groove with respect to a normal line of the tread surface as viewed in the radial direction of the tire, at the same time, at the outer side than the inner surface of the tire as viewed in the radial direction of the tire, the load applied to the shoulder land portion is reduced while avoiding the stiffness of the sacrifice portion from being reduced. As a result, in the above pneumatic tire, partial wear can be reduced while maintaining the durability of the shoulder land portion of the tire.

In the above pneumatic tire, when defining the depth "H" of the buttress groove, the depth "H" is preferably set to be $0.1D < H < 0.2D$. With this arrangement, the stiffness of the sacrifice portion can be satisfactorily ensured while reducing the load applied to the shoulder land portion during running on the road.

DETAILED DESCRIPTION OF THE PREFERRED EMBODIMENTS

Figure 1:
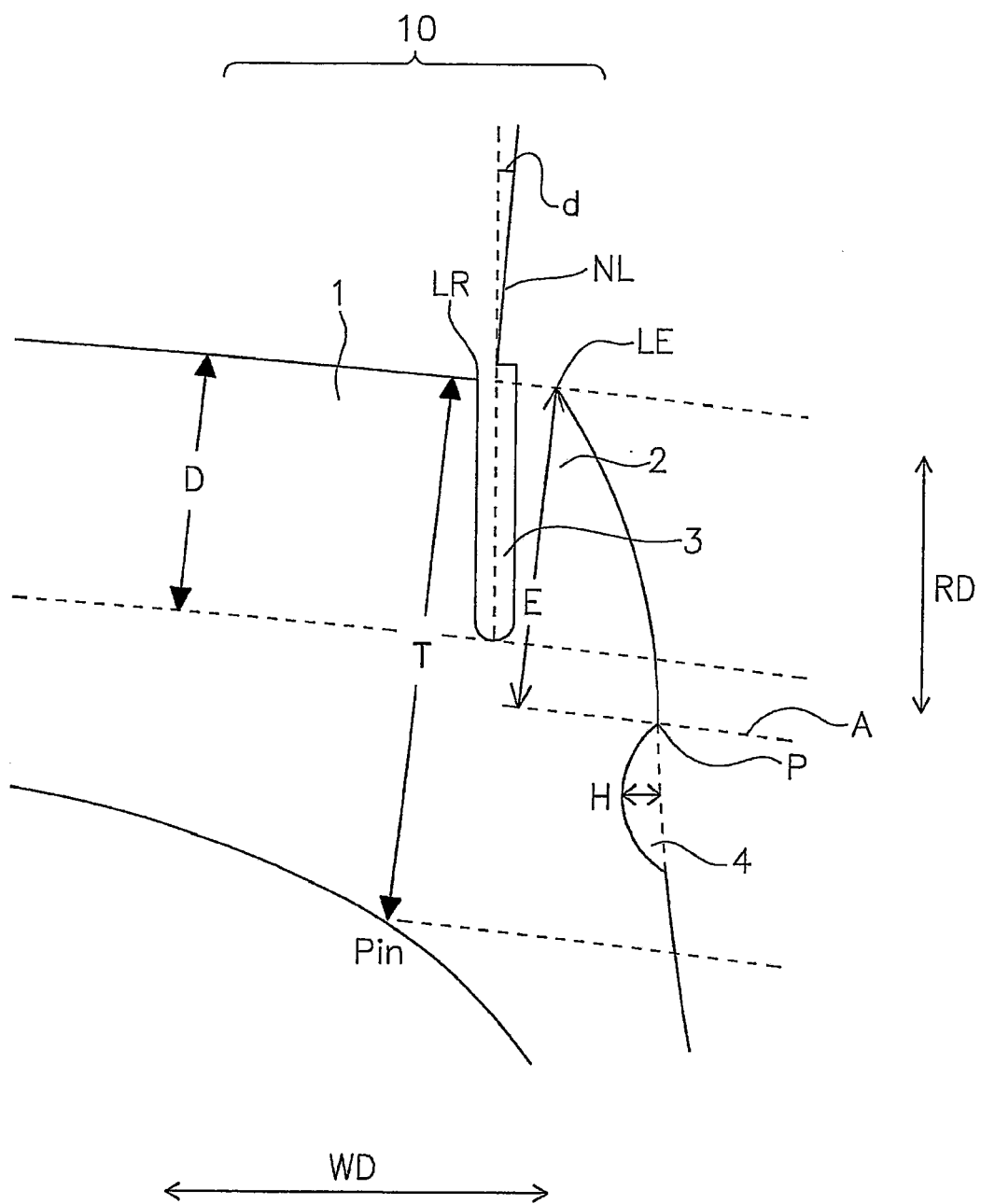
FIG. 1 is a cross-sectional view illustrating an example of a shoulder land portion of a pneumatic tire according to the present invention as viewed from a meridian direction of the tire.

Embodiments of the present invention will be described below. FIG. 1 is a cross-sectional view illustrating an example of a shoulder land portion of a pneumatic tire according to the present invention as viewed from a meridian direction of the tire. In FIG. 1, reference symbol "RD" indicates a radial direction of the tire; and reference symbol "WD" indicates a width direction of the tire.

As shown in FIG. 1, the pneumatic tire according to the present embodiment has a tread surface that includes a shoulder land portion 10 extending in a circumferential direction of the tire. The shoulder land portion 10 is formed with a thin groove 3 that is located at an inner side than a contact edge LE thereof as viewed in the width direction of the tire and extends in the circumferential direction of the tire. The thin groove 3 partitions the shoulder land portion 10 into a main portion 1 located at the inner side and a sacrifice portion 2 located at the outer side with respect to the thin groove 3 as viewed in the width direction of the tire.

The shoulder land portion 10 is located at the outer side than a main groove located at the outermost of a plurality of main grooves extending in a circumferential direction on the tread surface as viewed in the width direction of the tire (not shown in FIG. 1). The present embodiment gives an example of a rib type in which the shoulder land portion 10 includes the main land portion 1 and the sacrifice portion 2. The pneumatic tire according to the present invention may employ any type of tread patterns with no limitation. That is, a rib type, a block type, a rag type or the like may be employed.

The thin groove 3 is located at the inner side than the contact edge LE and extends in the circumferential direction of the tire in the shoulder land portion 10. In the present invention, in order to effectively reduce the partial wear of the pneumatic tire, the thin groove 3 is preferably formed within an area of 5% or less of the tread contact width from the contact edge LE. A depth D of the thin groove 3 may be appropriately changed depending on the size of the pneumatic tire. For example, in the case of the size of 11R22.5, in order to reduce the partial wear, the depth D is preferably 10 to 20 mm, more preferably 14 to 16 mm. Also, in the embodiment, the thin groove 3 is arranged so that the groove width in the width direction WD is substantially constant from the tread surface to the groove bottom. The groove width of the thin groove 3 is, for example, 0.5 to 3.0 mm.

The buttress groove 4 is located at the outer side than the contact edge LE of the shoulder land portion as viewed in the width direction of the tire and extends in the circumferential direction of the tire. In the present embodiment, the buttress groove 4 is formed in a single arc-like shape as viewed in a cross-section in the meridian direction of the tire. A depth H of the buttress groove is preferably arranged to be, with respect to the depth D of the thin groove 3, within a range of 0.1D<H<0.2D. With this arrangement, the load applied to the main land portion of the thin groove side edge during running on the road can be reduced while the stiffness of the sacrifice portion 2 can be satisfactorily obtained.

According to the present invention, the thin groove 3 is arranged to be perpendicular to (in a normal direction of the tread surface) or inclined outward in the width direction of the tire from the tread surface toward the groove bottom as viewed in the cross-section in the meridian direction of the tire. With this arrangement, stiffness of the main land portion 1 can be ensured and anti-wear performance of the entire shoulder land portion 10 can be increased. At the same time, the stiffness of the sacrifice portion 2 in the base portion thereof can be appropriately reduced. Therefore, even when the sacrifice portion 2 is deformed during running on the road, the convergence of stress on the groove bottom of the thin groove 3 can be prevented; and thus, cracks can be prevented from being generated on the groove bottom of the thin groove 3. In the present embodiment, the thin groove 3 is inclined outward as viewed in the width direction of the tire with respect to the normal line of the tread surface, and the inclination angle is set to a as shown in FIG. 1. In order to reduce partial wear of the pneumatic tire and to prevent cracks from being generated on the groove bottom of the thin groove 3, the inclination angle $\alpha$ is preferably set to 0 to 10°, more preferably to 3 to 7°. The inclination angle $\alpha$ indicates particularly an angle formed by a center line of the thin groove 3 as viewed in the width direction of the tire and the normal line of the tread surface therebetween.

In the present invention, when defining a depth of the thin groove 3 as "D", a distance from an edge line LR, which is formed by the thin groove 3 and the main land portion 1 therebetween, to a inner surface of the tire "Pin" as "T", a distance from the contact edge LE of the shoulder portion to a straight line "A", which goes through the outer end "P" of the buttress groove 4 and is parallel to the tread surface as viewed in the radial direction of the tire, as "E", the values are arranged to be $D \leqq E \leqq T$. This arrangement appropriately reduces the load, which is applied to the shoulder land portion 10 during running on the road, without reducing the stiffness of the sacrifice portion 2.

The present invention provides the effects to reduce partial wear and to prevent cracks as described above. Therefore, the present invention is applicable effectively particularly to heavy load pneumatic tires which include a shoulder rib potentially having a problem such that a large partial wear appears at the main land portion of the thin groove side edge of shoulder land portion.

Furthermore, according to the present invention, since the thin groove and the buttress groove are arranged as described above, the volume of rubber around the belt can be reduced as well as the surface area of the tire is increased resulting in an increased air-cooling effect. As a result, the pneumatic tire according to the present invention provides an increased durability of the belt.

The pneumatic tire of the present invention is the same as conventional pneumatic tires excepting a point that the thin groove and buttress groove are arranged as described above. Therefore, any of conventional materials, configurations, structures and manufacturing methods may be employed to the present invention.

[Other Embodiments]

Figure 2:
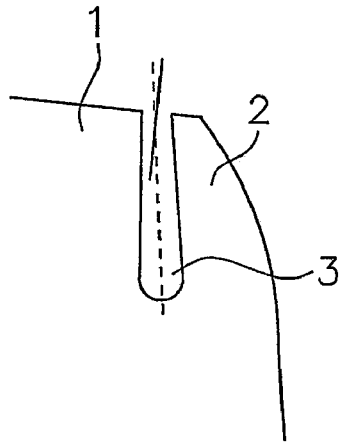
FIG. 2 illustrates a variation of thin groove of the present invention.
Figure 2:
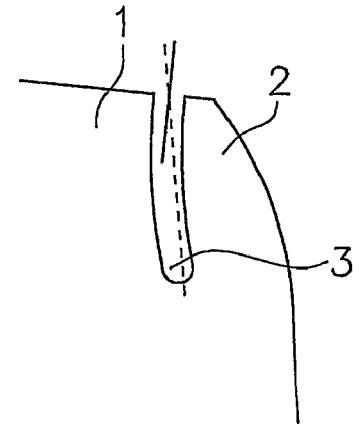

(1) The above-described embodiment gives an example in which the thin groove 3 is arranged to have generally constant width from the tread surface to the groove bottom as viewed in the width direction "WD" and to be generally straight as viewed in the cross-section in the meridian direction of the tire. However, according to the present invention, when the center line of the thin line groove extends in a normal line direction of the tread surface or outward as viewed in the width direction with respect to the normal line of the tread surface as viewed in the width direction, the thin groove may be desirably designed within a range that the stiffness of the sacrifice portion is not largely decreased. In particular, for example, the groove width of the thin groove 3 may be arranged to be gradually increased from the tread surface to the groove bottom as viewed in the width direction WD (FIG. 2A). Alternately, the thin groove 3 may be curved outward as viewed in the width direction of the tire (FIG. 2B). However, in order to prevent the occurrence of cracks on the thin groove, it is preferred not to form curved portion on the walls of the thin groove.

Figure 3:
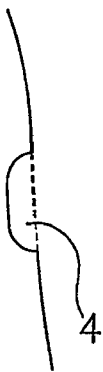
FIG. 3 illustrates a variation of buttress groove of the present invention.
Figure 3:
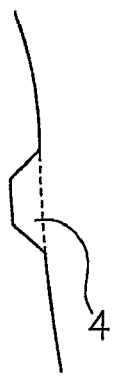
Figure 3:
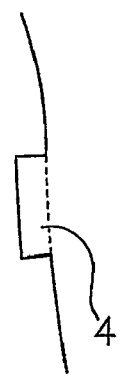
Figure 3:
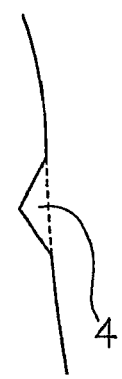
Figure 3:
Figure 3:
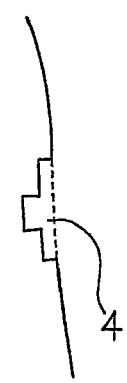
Figure 3:
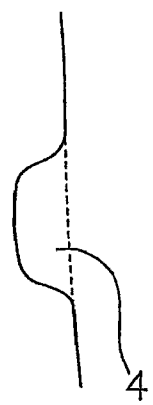
Figure 3:
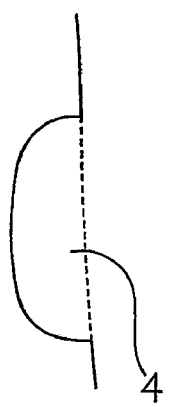

(2) The above-described embodiment gives an example in which the buttress groove 4 is formed in a single arc-like shape as viewed in the cross-section in the meridian direction of the tire. However, according to the present invention, when the depth "H" of the buttress groove with respect to the depth "D" of the thin groove is set to be $0.1D<H<0.2D$, any configuration shown in FIGS. 3A to 3H may be employed. FIG. 3G illustrates an example in which an edge line formed by the buttress groove 4 and the surface of the tire therebetween is arranged to have an arc-like shape protruding toward the surface of the tire. FIG. 3H illustrates an example in which the groove bottom of the buttress groove 4 is formed in a large arc-like shape and the both side walls of the buttress groove 4 are formed in a small arc-like shape.

EXAMPLES

Example and Comparative Examples that particularly demonstrate the structure and effect of the present invention are described below. Items to be evaluated are as described below and measurement was conducted on each of the Example and Comparative Examples.

Anti-Partial Wear Performance

Test tires (295/75R22.5) were mounted to front wheels of tractor of a line-hauler. After running 80,000 Km on a dry road, volume of partial wear was measured. Inverse number of the measured volume was used for evaluation of anti-partial wear performance. When defining the value of Comparative Example 1 as 100, the evaluation is indicated with index number. The larger number means the more preferable anti-partial wear performance.

Example 1

Test pneumatic tires ($\alpha=5°$, D=15 mm, E=20 mm, T=45 mm, H=2.5 mm) having shoulder land portions structure shown in FIG. 1 were produced. Using test pneumatic tires, the above test was conducted and evaluated. Test result is shown in Table 1.

Comparative Example 1

Conventional Example

Pneumatic tires having the same structure as that of the Example 1, except for having only thin groove ($\alpha=5°$, D=15 mm) (having no buttress groove 4) were manufactured in the structure shown in FIG. 1. Using test pneumatic tire tires, the above test was conducted and evaluated. Test result is shown in Table 1.

Comparative Example 2

Pneumatic tires having the same structure as that of the Example 1, except that E<D (D=15 mm, E=10 mm). Using test pneumatic tire tires, the above test was conducted and evaluated. Test result is shown in Table 1.

Comparative Example 3

Pneumatic tires having the same structure as that of the Example 1, except that T<E (T=45 mm, E=50 mm). Using test pneumatic tire tires, the above test was conducted and evaluated. Test result is shown in Table 1.

TABLE 1

|  | Comparative Example 1 | Example 1 | Comparative Example 2 | Comparative Example 3 |
|---|---|---|---|---|
| Anti-partial wear performance | 100 | 110 | 94 | 100 |

As shown in Table 1, it is demonstrated that, compared to the pneumatic tire of Comparative Example 1, in the pneumatic tire of Example 1, anti-partial wear performance is improved. On the other hand, it is demonstrated that, in the pneumatic tire of Comparative Example 2, since the stiffness of the sacrifice portion 2 is reduced, anti-partial wear performance is degraded. Further it is demonstrated that, in the pneumatic tire of Comparative Example 3, since the buttress groove 4 does not work effectively, the anti-partial wear performance is improved little.

What is claimed is:

1. A pneumatic tire, comprising a tread surface, the tread surface including:
a shoulder land portion extending in a circumferential direction of the tire; and
a thin groove extending in a circumferential direction of the tire located at, as viewed in a width direction of the tire, the inner side than a contact edge of the shoulder land portion, the thin groove partitioning the shoulder land portion into a main land portion located at the inner side and a sacrifice portion located at the outer side thereof,
the pneumatic tire also including a buttress groove extending in the circumferential direction of the tire located at, as viewed in a width direction of the tire, the outer side than the contact edge of the shoulder land portion, wherein
the thin groove is arranged to, as viewed in the cross-section in a meridian direction of the tire, extend from the tread surface perpendicularly or being inclined outward with respect to the groove bottom,
when defining a depth of the thin groove as "D" a distance from an edge line formed by the thin groove and the main land portion therebetween to an inner surface of the tire as "T", and a distance from the contact edge of the shoulder land portion to a virtual straight line extended, as viewed in a radial direction of the tire, parallel to the tread surface through an outer end of the buttress groove as "E", the values are set to be $D \leq E \leq T$ (wherein, each of D, E and T is measured in a direction of a normal line of the tread surface), and
when defining a depth of the buttress groove as "H", the depth is arranged to be $0.1D<H<0.2D$.

* * * * *

UNITED STATES PATENT AND TRADEMARK OFFICE
CERTIFICATE OF CORRECTION

PATENT NO. : 8,381,783 B2
APPLICATION NO. : 12/792830
DATED : February 26, 2013
INVENTOR(S) : Akinori Miyake Page 1 of 1

It is certified that error appears in the above-identified patent and that said Letters Patent is hereby corrected as shown below:

In the Claims:

Column 6, Line 53, Claim 1, after ""D"" insert -- , --.

Signed and Sealed this
Fourteenth Day of May, 2013

Teresa Stanek Rea
*Acting Director of the United States Patent and Trademark Office*